United States Patent
Fischer et al.

(10) Patent No.: US 10,467,829 B1
(45) Date of Patent: Nov. 5, 2019

(54) LEVERAGING WIRELESS CONNECTIONS FOR AUTOMATED MILEAGE TRACKING

(71) Applicants: Samuel Henry Michael Fischer, San Francisco, CA (US); Jonathan David Fasoli, Mountain View, CA (US); Shrisha Radhakrishna, San Jose, CA (US)

(72) Inventors: Samuel Henry Michael Fischer, San Francisco, CA (US); Jonathan David Fasoli, Mountain View, CA (US); Shrisha Radhakrishna, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 182 days.

(21) Appl. No.: 15/721,721

(22) Filed: Sep. 29, 2017

(51) Int. Cl.
| | |
|---|---|
| G01C 17/38 | (2006.01) |
| G07C 5/08 | (2006.01) |
| G07C 5/02 | (2006.01) |
| G06F 17/27 | (2006.01) |
| G01S 19/42 | (2010.01) |
| H04W 4/02 | (2018.01) |

(52) U.S. Cl.
CPC ............ G07C 5/0858 (2013.01); G01S 19/42 (2013.01); G06F 17/27 (2013.01); G07C 5/02 (2013.01); H04W 4/025 (2013.01)

(58) Field of Classification Search
CPC combination set(s) only.
See application file for complete search history.

(56) References Cited

PUBLICATIONS

3 Apps for Tracking your Mileage; pulished Jun. 15, 2017 (4 pages) https://www.cnet.com/how-to/3-apps-for-tracking-your-mileage/.

*Primary Examiner* — Bhavesh V Amin
(74) *Attorney, Agent, or Firm* — Ferguson Braswell Fraser Kubusta PC

(57) ABSTRACT

A method for automatically tracking mileage may include detecting a connection between a wireless sensor of a mobile device of a user and a wireless device, determining that the wireless device corresponds to a vehicle of the user, initiating tracking of a trip of the vehicle in response to detecting the connection, detecting termination of the connection using the wireless sensor, stopping tracking of the trip in response to detecting the termination of the connection, determining that the termination of the connection was caused by a dropped connection, and resuming tracking of the trip in response to determining that the termination of the connection was caused by the dropped connection.

20 Claims, 6 Drawing Sheets

LEVERAGING WIRELESS CONNECTIONS FOR AUTOMATED MILEAGE TRACKING

BACKGROUND

Mileage tracking is important for individuals who drive a personal vehicle for business purposes. Careful tracking of trip histories can result in tax deductions and savings for these individuals. However, accurate automated tracking of mileage (e.g., via a software application executing on a smartphone) remains a difficult task. For example, start and stop traffic and loss of cell reception may cause inaccuracies in software-based mileage records.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for automatically tracking mileage including detecting a connection between a wireless sensor of a mobile device of a user and a wireless device, determining that the wireless device corresponds to a vehicle of the user, initiating tracking of a trip of the vehicle in response to detecting the connection, detecting termination of the connection using the wireless sensor, stopping tracking of the trip in response to detecting the termination of the connection, determining that the termination of the connection was caused by a dropped connection, and resuming tracking of the trip in response to determining that the termination of the connection was caused by the dropped connection.

In general, in one aspect, one or more embodiments relate to a system for automatically tracking mileage including a wireless device of a vehicle of a user and a mobile device of the user including a wireless sensor, a computer processor, and a memory including instructions that, when executed by the computer processor, cause the computer processor to detect a connection between the wireless sensor and the wireless device, determine that the wireless device corresponds to the vehicle, initiate tracking of a trip of the vehicle in response to detecting the connection, detect termination of the connection using the wireless sensor, stop tracking of the trip in response to detecting the termination of the connection, determine that the termination of the connection was caused by a dropped connection, and resume tracking of the trip in response to determining that the termination of the connection was caused by the dropped connection. The system further includes a repository configured to store at least the trip.

In general, in one aspect, one or more embodiments of the invention relate to a non-transitory computer readable medium including instructions that, when executed by a processor, perform a method for automatically tracking mileage including detecting a connection between a wireless sensor of a mobile device of a user and a wireless device, determining that the wireless device corresponds to a vehicle of the user, initiating tracking of a trip of the vehicle in response to detecting the connection, detecting termination of the connection using the wireless sensor, stopping tracking of the trip in response to detecting the termination of the connection, determining that the termination of the connection was caused by a dropped connection, and resuming tracking of the trip in response to determining that the termination of the connection was caused by the dropped connection.

Other aspects of the invention will be apparent from the following description and the appended claims.

DETAILED DESCRIPTION

Figure 1:
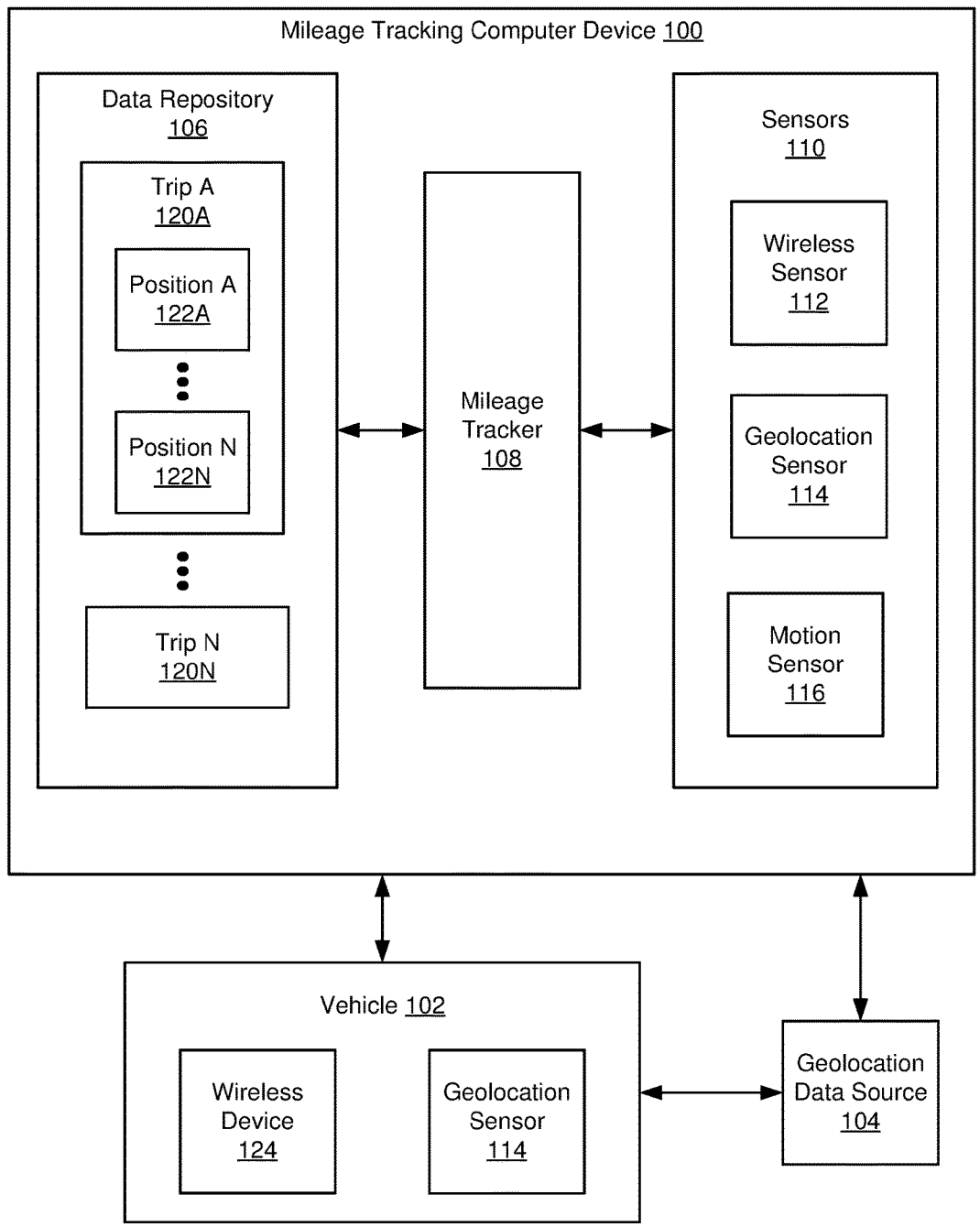
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention are directed to a system, method, and non-transitory computer readable medium for automatically tracking mileage. In one or more embodiments, detecting the presence and termination of wireless connections is used to determine when to start and stop tracking trips. A connection between a wireless (e.g., Bluetooth) sensor of a mobile device of a user and a wireless device may be detected. The wireless device (e.g., a vehicle music system or on-board diagnostic device) may be registered with a vehicle of the user used for business travel. Tracking a trip of the vehicle, using a geolocation sensor and the mobile device's native operating system location services, may be initiated in response to detecting the connection between the wireless sensor of the mobile device and the wireless device of the vehicle. Tracking of the trip may be stopped in response to detecting the termination of the connection. Tracking of the trip may be resumed if it is determined that the termination of the connection was caused by a dropped connection (e.g., if the mobile device was within range of the vehicle at the time the connection was terminated). Using the presence and termination of wireless connections to determine when to start and stop tracking of trips may increase the accuracy of mileage tracking by avoiding incorrect dividing of trips (e.g., when the user remains within wireless range of the vehicle). In addition, tracking of trips may be restricted to vehicles used by the user for business travel.

FIG. 1 shows a system in accordance with one or more embodiments of the invention. As shown in FIG. 1, the system includes a mileage tracking computing device (100), a vehicle (102), and a geolocation data source (104). In one or more embodiments, the mileage tracking computing device (100) takes the form of the computing system (500) described with respect to FIG. 5A and the accompanying description below, or takes the form of the client device (526) described with respect to FIG. 5B.

In one or more embodiments, the mileage tracking computing device (100) includes a data repository (106), a mileage tracker (108), and sensors (110). The sensors (110) may include a wireless sensor (112), mileage device geolocation sensor (114), a motion sensor (116), and various other sensors.

In one or more embodiments, the geolocation data source (104) may be one or more GPS satellites, a location data provider providing data over a computer network, a cellular tower, and/or any other geolocation data source capable of providing information related to the location of the mileage tracking computing device (100) and/or the vehicle (102). In one or more embodiments, the geolocation data source (104) includes functionality to return geolocation data that may be used for determining a location/position. Geolocation data may include, but is not limited to, coordinates (e.g., global positioning system (GPS) coordinates) obtained or calculated by the geolocation data source (104), distance information from landmarks (e.g., cellular towers), signal strength, and timestamp information. For example, the geolocation data source (104) may use a geolocation sensor (114) (e.g., a geolocation sensor (114) of the mileage tracking computing device (100) or the vehicle (102)) to obtain the geolocation data. In one or more embodiments, the geolocation data source (104) includes functionality to access one or more GPS satellites, a location data provider providing data over a computer network, a cellular tower, and/or any other geolocation data source capable of providing information related to the location of the mileage tracking computing device (100) and/or the vehicle (102). In one or more embodiments, the geolocation data source (104) may utilize a combination of technologies, including cellular data, wifi data, GPS data, etc.

The wireless sensor (112) may be any combination of software, firmware, and/or hardware that executes on the mileage tracking computing device (100) to detect a wireless connection between the mileage tracking computing device (100) and a wireless device (e.g., wireless device (124) of the vehicle (102)). For example, the wireless sensor (112) may utilize Bluetooth®, Infrared Data Association (IrDA), and various radio frequency (RF) communication protocols defined by the IEEE 802.11 or other standards.

The geolocation sensor (114) may be any combination of software, firmware, and/or hardware that executes on a host (e.g., the host may be the mileage tracking computing device (100) or the vehicle (102)) to track positions of the host. The geolocation sensor (114) may be resident on the host. In one or more embodiments, the geolocation sensor (114) includes functionality to return geolocation (e.g., GPS) coordinates detailing the global position of the host.

The motion sensor (116) (e.g., an accelerometer) may be any combination of software, firmware, and/or hardware that executes on the mileage tracking computing device (100) to provide motion data pertaining to the mileage tracking computing device (100). In one or more embodiments, motion data may be represented in terms of one or more motion attributes, including the velocity, acceleration, torque and/or orientation of the mileage tracking computing device (100). The motion attributes may be represented using values for the x, y and z coordinate axes of the mileage tracking computing device (100). A motion pattern may be based on motion data obtained from the motion sensor (116). For example, one motion pattern may suggest that a user is driving, and another motion pattern may suggest that a user is walking, etc. For example, a stationary motion pattern may correlate with the absence of motion along any axis. In contrast, a walking motion pattern may correlate with motion along at least one axis.

In one or more embodiments, the data repository (106) is any type of storage unit and/or device (e.g., a file system, database, collection of tables, or any other storage mechanism) for storing data. Further, the data repository (106) may include multiple different storage units and/or devices. The multiple different storage units and/or devices may or may not be of the same type or located at the same physical site.

In one or more embodiments, the data repository (106) includes functionality to store trips (120A, 120N). Each trip (120N) may include a sequence of positions (122A, 122N). Each position (122N) may be, for example, defined in GPS coordinates. Each position (122N) may include a timestamp (e.g., indicating a time at which the position (122N) was recorded).

In one or more embodiments of the invention, the mileage tracker (108) includes functionality to obtain and/or generate temporal data. Temporal data refers to any data related to time or that may be used for determining a time. Such data may be stored in the data repository (106), and may include, but is not limited to, information such as temporal information included in and/or derived from geolocation data, information related to time received via a network, information related to time obtained locally from the mileage tracking computing device (100), and/or any other source of temporal data. Temporal data may be stored in any unit of time (e.g., minutes, hours, days, etc.) and a given time value may be stored as one or more unit types. In one or more embodiments of the invention, though not shown in FIG. 1, the mileage tracking computing device (100) includes one or more clock devices for keeping time, and may include functionality to obtain temporal data from the one or more clock devices.

In one or more embodiments, the mileage tracker (108) includes functionality to detect that a trip (120N) has begun. Detecting that a trip (120N) has begun may be based on detecting a wireless connection (e.g., a Bluetooth signal) between the wireless sensor (112) of the mileage tracking computing device (100) and the wireless device (124) of a vehicle (102).

In one or more embodiments, the mileage tracker (108) includes functionality to detect a trip updating event. For example, a new trip updating event may be triggered when a predetermined amount of time has elapsed relative to the previous trip updating event. When a trip updating event is detected, the mileage tracker (108) may obtain an updated position (122N) of the mileage tracking computing device (100) to be added to the trip (120N). Since there may be many ways to travel from a starting position (122N) to an ending position (122N), the mileage tracker (108) obtains a series of updated positions (122A, 122N) for the trip (120N) that describe the path traveled during the trip (120N). In one or more embodiments, the mileage tracker (108) may obtain the updated position (122N) of the mileage tracking computing device (100) from the geolocation data source (110). In one or more embodiments, the mileage tracker (108) may request the position (122N) via an application programming interface (API), operating system or software application of the mileage tracking computing device (100).

In one or more embodiments, the mileage tracker (108) includes functionality to detect that a trip (120A, 120N) has ended. Detecting that a trip (120A, 120N) has ended may be based on detecting the termination of a wireless connection between the wireless sensor (112) of the mileage tracking computing device (100) and the wireless device (124) of a vehicle (102).

Continuing with FIG. 1, in one or more embodiments, the vehicle (102) includes a wireless device (124) and a geolocation sensor (114). The wireless device (124) may be any combination of software, firmware, and/or hardware that executes in the vehicle (102) with the capability to establish a wireless connection with a wireless sensor (112). For example, the wireless device (124) may be a vehicle music system (e.g., a CD or DVD player installed in the vehicle (102)), an on-board diagnostic (OBD) device, and/or any wireless device (124) residing in the vehicle (102). In one or more embodiments, the presence of a connection between the wireless sensor (112) and the wireless device (124) indicates that the mileage tracking computing device (100) is within a pre-determined distance of the vehicle (102).

In one or more embodiments, the mileage tracker (108) includes functionality to detect a connection between the wireless sensor (112) and the wireless device (124). For example, the connection may be detected using a Bluetooth application programming interface (API) of the mileage tracking computing device (100) or a Bluetooth capability provided by the operating system of the mileage tracking computing device (100).

In one or more embodiments, the mileage tracker (108) includes functionality to determine that the termination of a connection between the wireless sensor (112) and the wireless device (124) was caused by a dropped connection. A dropped connection may be caused by a variety of factors, including: interference from other wireless devices, a loss of power to the mileage tracking computing device (100) (e.g., due to a low battery level), a hardware or software failure (e.g., due to out-of-date firmware) of the mileage tracking computing device (100), a change in the physical orientation of the mileage tracking computing device (100) (e.g., due to the motion of the user), environmental conditions, etc.

While FIG. 1 shows a configuration of components, other configurations may be used without departing from the scope of the invention. For example, various components may be combined to create a single component. As another example, the functionality performed by a single component may be performed by two or more components.

Figure 2:
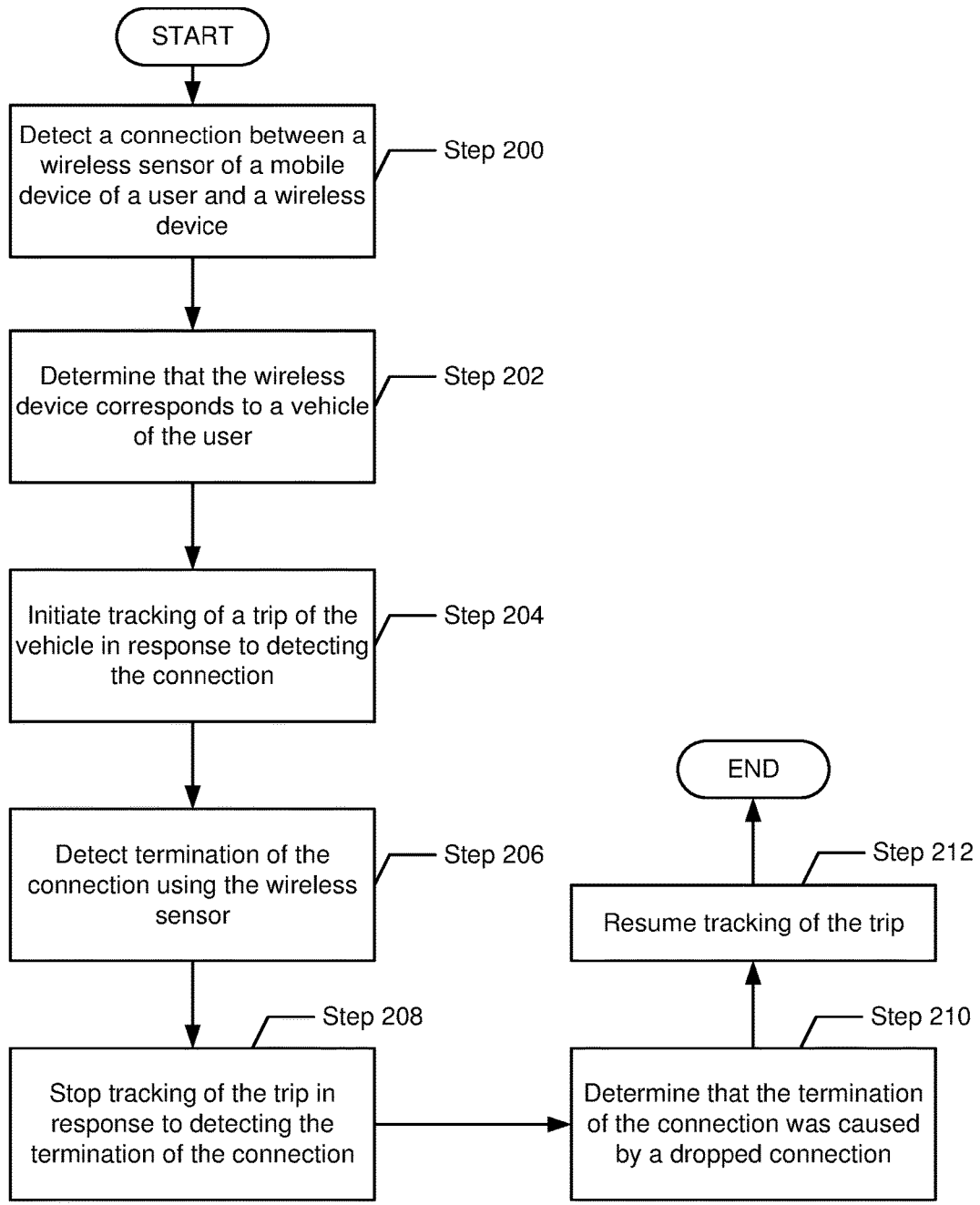
FIG. 2 and FIG. 3 show flowcharts in accordance with one or more embodiments of the invention.

FIG. 2 shows a flowchart in accordance with one or more embodiments of the invention. The flowchart depicts a process for automatically tracking mileage. One or more of the steps in FIG. 2 may be performed by the components of the mileage tracking computing device (100) (e.g., the mileage tracker (108)), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, a connection between a wireless sensor of a mobile device of a user and a wireless device is detected. In one or more embodiments, the mileage tracking computing device is the mobile device. The connection (e.g., a Bluetooth signal) may be detected by the mileage tracker (e.g., using the capabilities of the operating system of the mileage tracking computing device).

In Step 202, it is determined that the wireless device corresponds to a vehicle of the user. In one or more embodiments, determining that the wireless device corresponds to a vehicle of the user is based on registering the wireless device with the mobile device. The wireless device may be registered with the mobile device the first time the wireless device is encountered (e.g., discovered) by the mobile device.

In one or more embodiments, registering the wireless device includes pairing the wireless device with the mileage tracking computing device. In one or more embodiments, registering the wireless device includes associating the wireless device with the vehicle of the user (e.g., based on input obtained from the user). Registering the wireless device may include indicating (e.g., based on input obtained from the user) that the vehicle is used by the user for business travel (e.g., and therefore mileage logged on trips associated with the vehicle may be used for tax deductions).

For example, the wireless device may be a vehicle music system or an OBD device. In one or more embodiments, detecting the connection in Step 200 above indicates that the distance between mileage tracking computing device and the vehicle is less than a pre-determined distance. For example, the user may be approaching the vehicle which has become within range of the wireless sensor of the mileage tracking computing device.

In one or more embodiments, the wireless device (e.g., an attached device) within a vehicle may be determined to correspond to the vehicle when a substring included in a dictionary of vehicle names is included in the device name of the wireless device. In one or more embodiments, the device name may be retrieved via a wireless interface (e.g., API) of the operating system of the mileage tracking computing device. For example, a wireless device whose device name includes the name of a vehicle manufacturer (e.g., "Audi-0192432") may be determined to correspond to a name of a vehicle manufacturer by identifying the substring as part of the device name (e.g., "Audi"). In one or more embodiments, natural language processing (NLP) techniques (e.g., rule-based techniques, statistics-based techniques, classification techniques such as Naïve Bayes classification, logistic regression, etc.) may be used to extract and/or learn substrings of device names that users have indicated correspond to vehicles.

In one or more embodiments, the wireless device may be determined to correspond to a vehicle when a type of device code (e.g., a Bluetooth device code) is received from the wireless device, where the device code identifies the device as being installed in a vehicle. For example, in the absence of receiving the device code, it may be possible to infer that the wireless device does not correspond to a vehicle, and therefore the aforementioned NLP techniques do not need to be performed.

In one or more embodiments, when the wireless device is subsequently encountered by the mobile device, the wireless device may be recognized as a vehicle of the user that is used for business travel, based on the previous registration of the wireless device.

In Step 204, tracking of a trip of the vehicle is initiated in response to detecting the connection. In one or more embodiments, the trip is tracked by tracking positions of the mileage tracking computing device. For example, positions (e.g., GPS coordinates and corresponding timestamps) of the mileage tracking computing device may be obtained from a geolocation data source using the geolocation sensor of the mileage tracking computing device. The trip may be tracked when the vehicle is used by the user for business travel (e.g., as indicated by the registration of the wireless device with the vehicle).

In Step 206, termination of the connection is detected using the wireless sensor. For example, the wireless sensor of the mileage tracking computing device may no longer be able to detect a Bluetooth signal from the wireless device of the vehicle. In one or more embodiments, the termination of the connection indicates that the distance between the mileage tracking computing device and the vehicle exceeds a pre-determined distance. For example, the user may have exited the vehicle and may have walked a distance that exceeds the range of the wireless sensor of the mileage tracking computing device.

In Step 208, tracking of the trip is stopped in response to detecting the termination of the connection. The position of the mileage tracking computing device when the connection was terminated may be obtained from the geolocation data source. Alternatively, in one or more embodiments, tracking of the trip may be stopped when a change in a motion pattern of a motion sensor of the mileage tracking computing device is detected. For example, if the motion pattern changes from a stationary pattern to a walking pattern, within a pre-determined time interval, then tracking of the trip may be stopped. In one or embodiments, tracking of the trip may be resumed once the motion pattern changes back to the stationary pattern from the walking pattern.

In Step 210, it is determined that the termination of the connection was caused by a dropped connection. A dropped connection may be caused by a variety of factors, including: interference from other wireless devices, a loss of power to the mileage tracking computing device (e.g., due to a low battery level), etc. In one or more embodiments, a dropped connection may be inferred when, at the time the connection was terminated, the distance between the mileage tracking computing device and the vehicle is within a pre-determined distance. For example, if the user was within the vehicle at the time the connection was terminated (i.e., the distance between the mileage tracking computing device and the vehicle is well within the pre-determined distance), then a dropped connection may be inferred to be the cause of the termination (e.g., instead of determining that the connection was terminated due to the user walking away from the vehicle outside the range of the wireless connection).

In one or more embodiments, a dropped connection may be inferred after the detection, within a pre-determined time interval following the termination of the connection, of a second connection between the wireless sensor of the mileage tracking computing device and the wireless device of the vehicle. That is, if the connection is terminated and then quickly reinstated after a brief time interval (e.g., when the user is at a rest stop or waiting at a train crossing), then a momentary dropped connection may have caused a transient loss of connection.

In one or more embodiments, a dropped connection may be inferred when, at the time of termination of the connection, the velocity of the mileage tracking computing device exceeds a pre-determined threshold velocity. For example, if the mileage tracking computing device is moving at a sufficiently high velocity, it may be inferred that the mileage tracking computing device is still within the vehicle and that the vehicle is still being driven by the user, and therefore a dropped connection may be the cause of the termination.

Data obtained from the motion sensor of mileage tracking computing device may be used to determine whether the termination of the connection was caused by a dropped connection. For example, a motion pattern based on data obtained from the motion sensor may indicate whether the user was driving (e.g., a stationary motion pattern is detected) or walking when the connection was terminated. The velocity of the mileage tracking computing device may be obtained using the motion sensor of mileage tracking computing device.

In one or more embodiments, the velocity of the mileage tracking computing device may be calculated by dividing the distance between the "termination position" of the mileage tracking computing device (i.e., the position of the mileage tracking computing device when the connection was terminated) and a most recently tracked position of the mileage tracking computing device by the amount of time elapsed between the timestamps corresponding to the termination position and the most recently tracked position.

In Step 212, tracking of the trip is resumed in response to determining that the termination of the connection was caused by the dropped connection. That is, once the dropped connection is determined to be the cause of the termination of the connection, then it may be inferred that it was premature to stop the tracking of the trip, and therefore tracking of the trip may be resumed.

Figure 3:
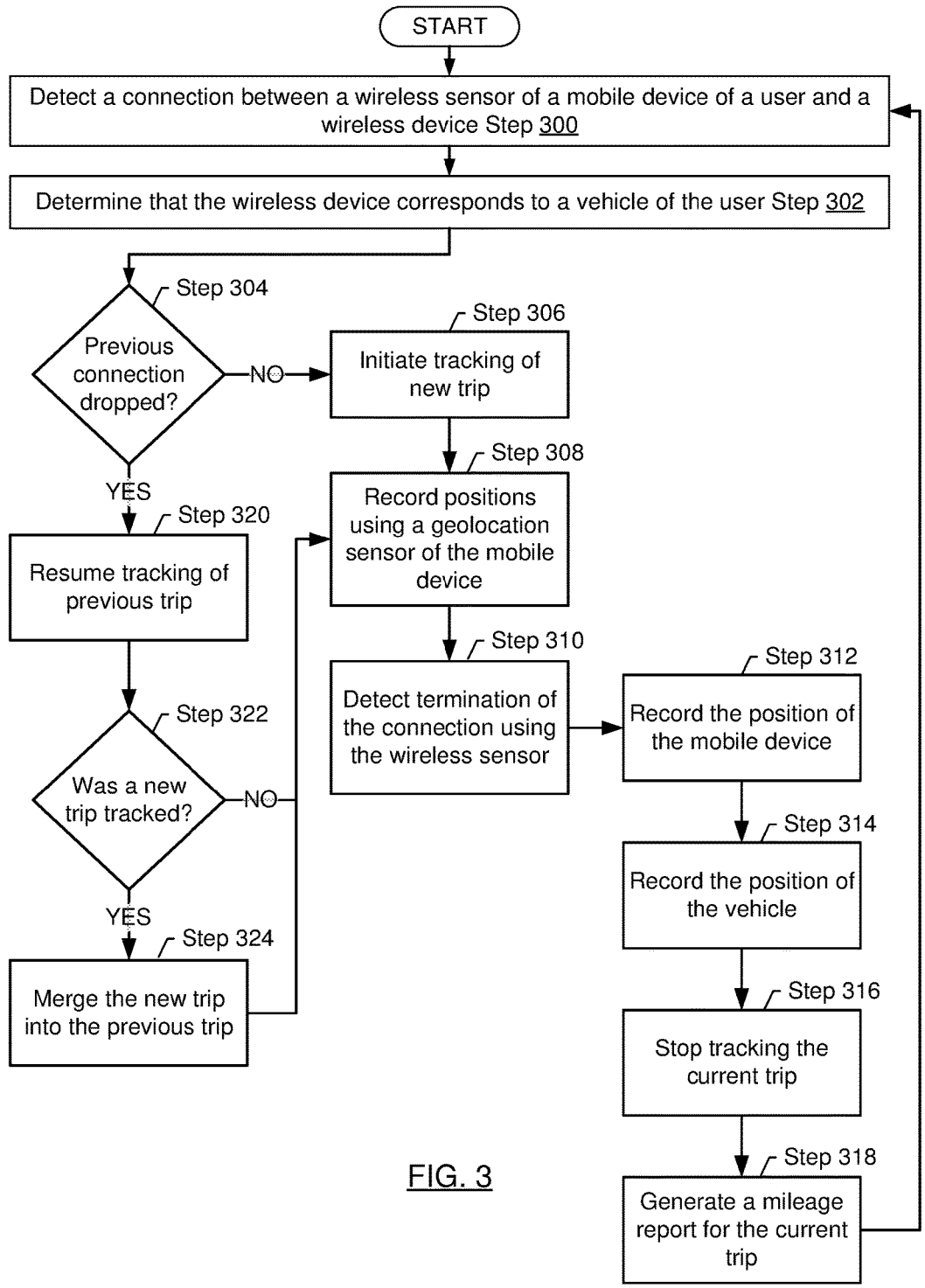

FIG. 3 shows a flowchart in accordance with one or more embodiments of the invention. The flowchart depicts a process for automatically tracking mileage. One or more of the steps in FIG. 3 may be performed by the components of the mileage tracking computing device (100) (e.g., the mileage tracker (108)), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a connection between a wireless sensor of a mobile device of a user and a wireless device is detected (see description of Step 200 above).

In Step 302, it is determined that the wireless device corresponds to a vehicle of the user (see description of Step 202 above).

If, in Step 304, it is determined that a previous connection between the wireless sensor and the wireless device was terminated due to a dropped connection (see description of Step 210 above), then in Step 306, tracking of a new trip of the vehicle is initiated (see description of Step 204 above). Otherwise, if Step 304 determines that the previous connection between the wireless sensor and the wireless device was not terminated due to a dropped connection, then Step 320 below is performed.

In Step 308, positions of the new trip are recorded using a geolocation sensor of the mobile device. The positions of the new trip may be stored in a data repository. A starting position of the new trip may be recorded when the connection is detected in Step 300 above. A set of intermediate positions of the new trip may be recorded when trip updating events are detected. For example, a new trip updating event may be triggered when a pre-determined amount of time has elapsed relative to a timestamp of the previous trip updating event.

In Step 310, termination of the connection is detected using the wireless sensor (see description of Step 206 above).

In Step 312, the position of the mobile device is recorded (see description of Step 308 above).

In Step 314, the position of the vehicle is recorded. In one or more embodiments, the position of the vehicle is obtained (e.g., using an API provided by the mileage tracking computing device or an application executing on the mileage tracking computing device) from a geolocation data source using the geolocation sensor of the vehicle.

In Step 316, tracking of the current trip is stopped (see description of Step 208 above).

In Step 318, a mileage report is generated for the current trip of the vehicle using the sequence of positions of the trip. Mileage may be calculated based on the positions of the trip. For example, the linear distances between all successive positions in the trip may be calculated and aggregated to obtain a total mileage. In another embodiment, a route is reconstructed by plotting the positions in the trip and matching the plotted positions to a known road or set of roads. The mileage may then be calculated according to the length of the route. Execution then continues with Step 300 above, to process the next connection between the wireless sensor and a wireless device.

In Step 320, tracking of a previous trip is resumed. For example, since the previous connection between the wireless sensor and the wireless device of the vehicle was terminated due to a dropped connection (according to Step 304 above), it may be incorrect to initiate tracking of a new trip.

If, in Step 322, it is determined that a new trip was tracked, then in Step 324, the new trip is merged into the previous trip. In one or more embodiments, tracking of a new trip may have been initiated using an alternate mileage tracking procedure (e.g., a mileage tracking procedure not based on detecting the presence and termination of wireless connections). For example, tracking of a new trip may have been initiated based on detecting that the velocity of the vehicle fell below, and then exceeded a minimum driving velocity. However, since the connection between the wireless sensor and the wireless device of the vehicle was not terminated, then it may be determined that a new trip should not have been initiated, and therefore the new trip may be merged with the previous trip.

Execution then continues with Step 308 above, to continue recording positions of the mobile device.

In one or more embodiments, tracking of the current trip is not stopped until the connection between the wireless sensor and the wireless device of the vehicle is terminated. Therefore, the mileage tracker may continue tracking the current trip in a variety of situations, including: the vehicle is stuck in traffic, the user temporarily exits the vehicle while staying within the range of the wireless sensor (e.g., to pump gas or check a tail light), or the user is traveling alongside the vehicle in another vehicle that is within the range of the wireless sensor.

Figure 4A:
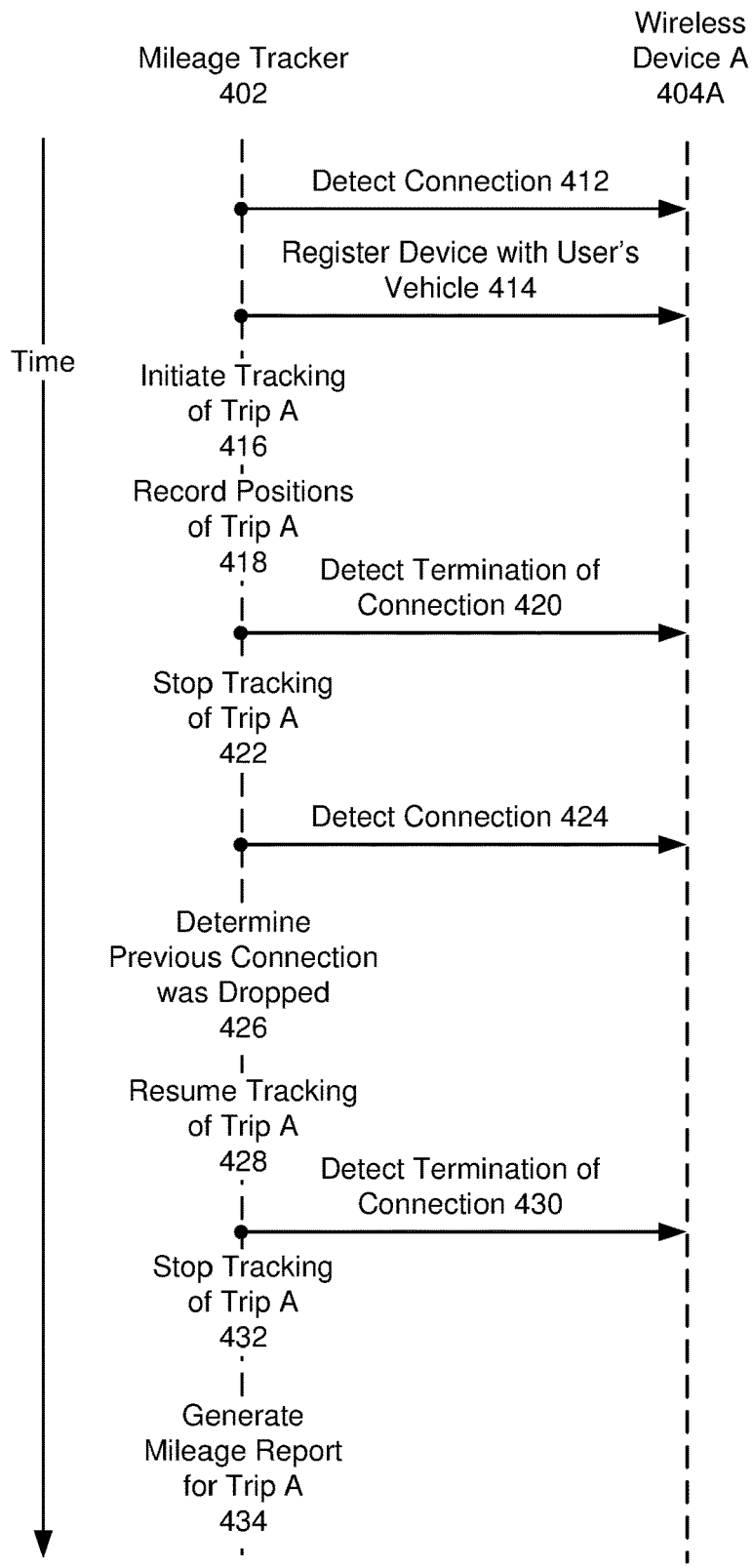
FIG. 4A and FIG. 4B show examples in accordance with one or more embodiments of the invention.
Figure 4B:
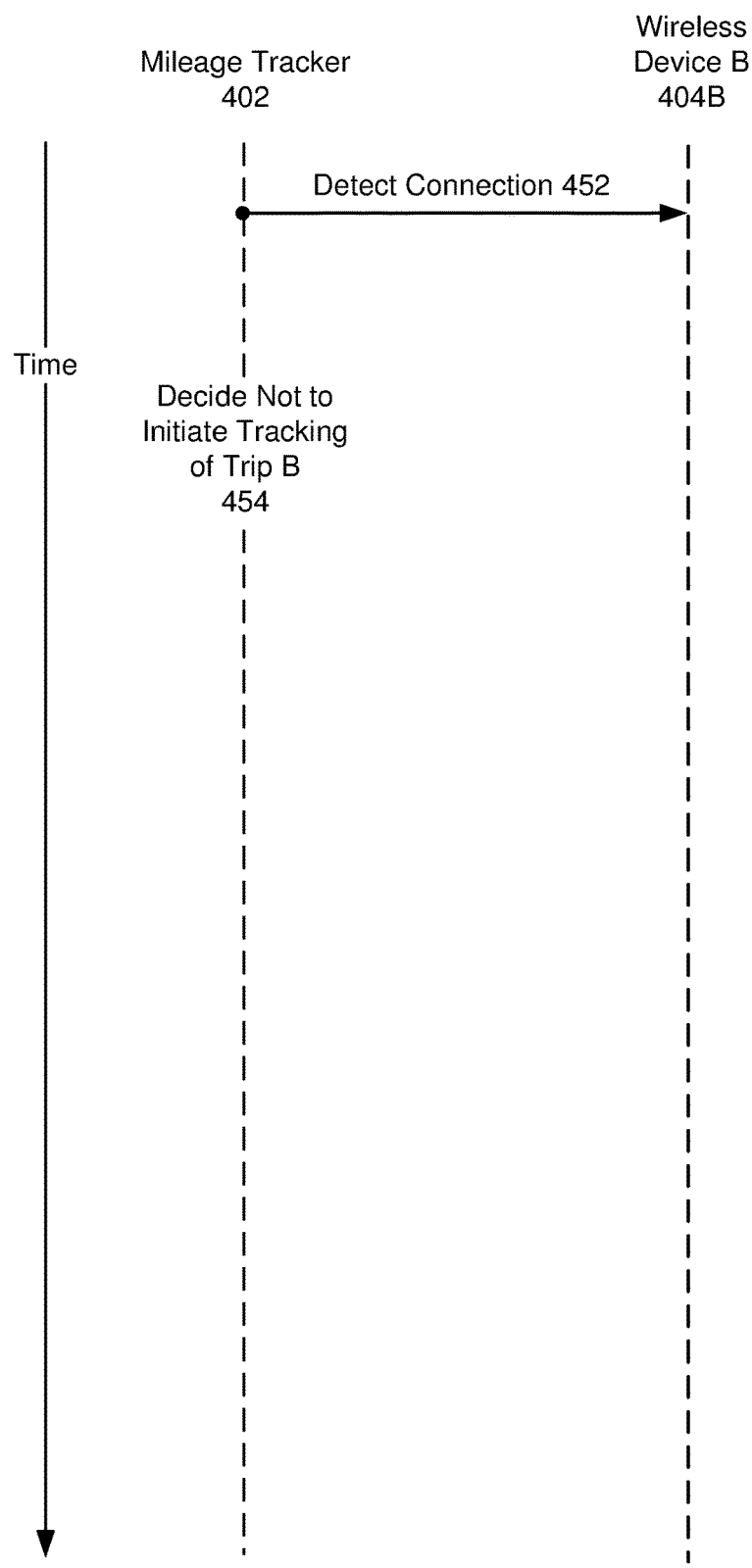

The following example is for explanatory purposes only and not intended to limit the scope of the invention. FIG. 4A and FIG. 4B show an implementation example in accordance with one or more embodiments of the invention.

FIG. 4A illustrates, in accordance with one or more embodiments, the relative timing of steps performed by one or more components described in reference to FIG. 1, in accordance with the flowcharts in FIG. 2 and FIG. 3. These components include: a mileage tracker (402) ((108) in FIG. 1)) and wireless device A (404A) ((124) in FIG. 1). In this example, a user of the mileage tracking computing device ((100) in FIG. 1) approaches a vehicle that includes wireless device A (404A), and wireless device A (404A) becomes within range of the wireless sensor.

Initially, in Step 412, the mileage tracker (402) detects a connection between a wireless sensor of the mileage tracking computing device and wireless device A (404A), a stereo system installed in the vehicle.

In Step 414, the mileage tracker (402) registers wireless device A (404A) with a vehicle of the user. The registration is based on identifying wireless device A (404A) as a wireless device of a vehicle, based on a substring detected in the device name of wireless device A (404A), in this case "DeLorean-1234567". The registration is also based on input from the user indicating that the vehicle, labeled as "DeLorean-1" by the mileage tracker (402), is used for business travel.

In Step 416, the mileage tracker (402) initiates tracking of trip A by recording a sequence of positions of a geolocation sensor of the mileage tracking computing device. The mileage tracker (402) records the starting position of trip A as the position at which when the connection is detected in Step 412 above. The mileage tracker (402) obtains the starting position from a GPS service accessible from the mileage tracking computing device.

In Step 418, the mileage tracker (402) records additional positions of the geolocation sensor (obtained from the GPS service) of the mileage tracking computing device as trip updating events are triggered. In this case, a new trip updating event is triggered every minute. The additional positions are added to trip A.

In Step 420, the mileage tracker (402) detects the termination of the connection between the wireless sensor and wireless device A (404A). At this point, the cause of the termination of the connection is unknown.

In Step 422, the mileage tracker (402) stops tracking trip A. The mileage tracker (402) adds to trip A the position of the mileage tracking computing device when the connection was terminated. The mileage tracker (402) records the position of DeLorean-1 when the termination of the connection between the wireless sensor and wireless device A (404A) is detected. The mileage tracker (402) obtains the position of DeLorean-1 using an API provided by the mileage tracking computing device that accesses a geolocation data source using the geolocation sensor of DeLorean-1.

In Step 424, the mileage tracker (402) detects a connection between the wireless sensor of the mileage tracking computing device and wireless device A (404A) (see description above of Step 412). The mileage tracker (402) recognizes wireless device A (404A) as a vehicle of the user that is used for business travel, based on the previous registration of wireless device A (404A) in Step 414 above.

In Step 426, the mileage tracker (402) determines that the termination of the connection in Step 420 above was caused by a dropped connection. The mileage tracker (402) inferred that the connection was dropped because, at the time the connection was terminated, the distance between the mileage tracking computing device and DeLorean-1 was within a pre-determined distance of 10 feet. In fact, the user was within DeLorean-1 at the time the connection was terminated.

In Step 428, the mileage tracker (402) resumes tracking of trip A. That is, after determining that the termination of the connection in step 420 above resulted from a dropped connection, the mileage tracker (402) determines that it was premature to stop the tracking of the trip A. In an alternate scenario, if the mileage tracker (402) determines that the termination of the connection in Step 420 above was not caused by a dropped connection, then the mileage tracker (402) would initiate tracking of a new trip B of the DeLorean-1 for the user.

In another alternate scenario, tracking of a new trip T of DeLorean-1 for the user was initiated (e.g., using a mileage tracking procedure not based on detecting the presence and termination of wireless connections) after the termination of the connection in step 420 above and before the mileage tracker (402) determined that the termination of the connection was caused by a dropped connection in Step 426. For example, tracking of trip T may have been initiated based on detecting that the velocity of DeLorean-1 fell below, and then exceeded a minimum driving velocity. In this alternate scenario, the new trip T is merged into trip A, thereby avoiding incorrect dividing of trip A.

In Step 430, the mileage tracker (402) detects the termination of the connection between the wireless sensor and wireless device A (404A) (see description above of Step 420). In this case, the connection is terminated when the user exits the vehicle DeLorean-1 and walks a sufficient distance from DeLorean-1 such that wireless device A (404A) is outside the range of the wireless sensor.

In Step 432, the mileage tracker (402) stops tracking trip A (see description above of Step 422). In an alternate scenario, tracking is stopped when a change in a motion pattern (e.g., from a stationary pattern to a walking pattern) of a motion sensor of the mileage tracking computing device is detected. In yet another alternate scenario, tracking is stopped when a monotonically decreasing signal strength is detected from wireless device A (404A) (e.g., as the user walks away from the vehicle DeLorean-1).

In Step 434, the mileage tracker (402) generates a mileage report for trip A using the sequence of positions of trip A. The mileage tracker (402) calculates and aggregates distances between successive positions in trip A to obtain a total mileage.

FIG. 4B illustrates, in accordance with one or more embodiments, the relative timing of steps performed by one or more components described in reference to FIG. 1, in accordance with the flowcharts in FIG. 2 and FIG. 3. These components include: a mileage tracker (402) ((108) in FIG. 1)) and wireless device B (404B) ((124) in FIG. 1).

In Step 452, the mileage tracker (402) detects a connection between the wireless sensor of the mileage tracking computing device and wireless device B (404B), an OBD installed in a vehicle, in this case, a taxi. The connection is detected as the user of mileage tracking computing device approaches the taxi that includes wireless device B (404B), and wireless device B (404B) becomes in range of the wireless sensor.

In Step 454, the mileage tracker (402) identifies wireless device B (404B) as a wireless device of a vehicle, based on a substring detected in the device name of wireless device B (404B), in this case "Audi-987654". The mileage tracker (402) labels the vehicle "Audi-1". However, the user indicates that Audi-1 is not a vehicle used by the user for business travel. Therefore, the mileage tracker (402) decides not to initiate tracking of the user's trip B on "Audi-1", thereby saving the user from needing to remove unnecessarily tracked non-business-related trips.

Figure 5A:
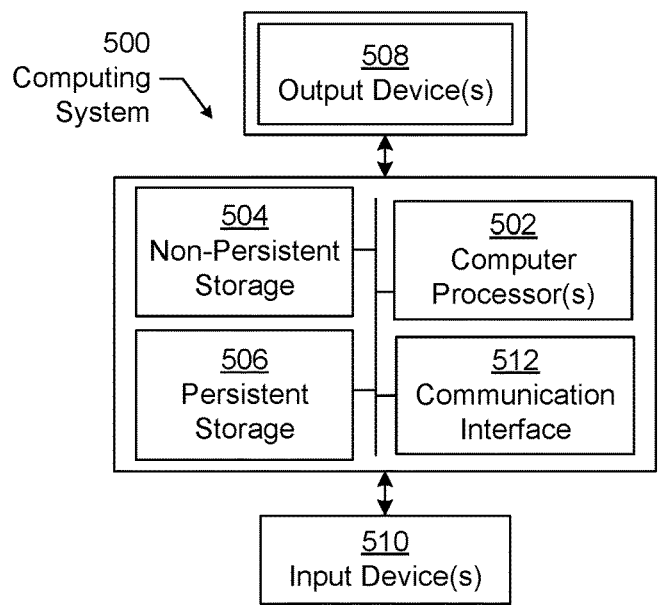
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
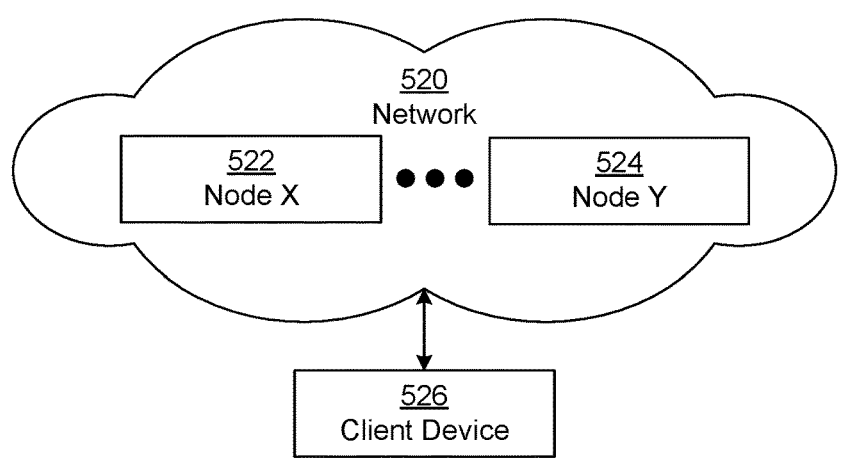

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for automatically tracking mileage, comprising:
   detecting a first connection between a wireless sensor of a mobile device of a user and a first wireless device;
   determining that the first wireless device corresponds to a first vehicle of the user;
   initiating tracking of a first trip of the first vehicle in response to detecting the first connection;
   detecting termination of the first connection using the wireless sensor;

stopping tracking of the first trip in response to detecting the termination of the first connection;
determining that the termination of the first connection was caused by a dropped connection; and
resuming tracking of the first trip in response to determining that the termination of the first connection was caused by the dropped connection.

2. The method of claim 1, wherein determining that the first wireless device corresponds to the first vehicle comprises:
identifying a device name of the wireless device, wherein the device name comprises a name of a vehicle manufacturer.

3. The method of claim 1, wherein determining that the termination of the first connection was caused by a dropped connection comprises:
recording, using a geolocation sensor of the mobile device, a user position when termination of the first connection is detected;
recording, using a geolocation sensor of the first vehicle, a vehicle position when termination of the first connection is detected; and
determining that a distance between the user position and the vehicle position is within a pre-determined distance.

4. The method of claim 1, wherein determining that the termination of the first connection was caused by a dropped connection comprises:
recording, using a geolocation sensor of the mobile device, an intermediate position and an intermediate timestamp when a trip updating event is detected;
recording, using the geolocation sensor of the mobile device, a stopping position and a stopping timestamp when termination of the first connection is detected;
calculating a velocity using the intermediate position, the stopping position, the intermediate timestamp, and the stopping timestamp; and
determining that the velocity exceeds a threshold velocity.

5. The method of claim 4, further comprising:
recording, using a geolocation sensor of the first vehicle, a vehicle position when termination of the first connection is detected; and
determining that a distance between the stopping position and the vehicle position is within a pre-determined distance.

6. The method of claim 1, further comprising:
recording, using a geolocation sensor of the mobile device, a sequence of positions of the first trip comprising a starting position, a set of intermediate positions, and a stopping position,
wherein the starting position is recorded when the first connection is detected,
wherein each intermediate position of the set of intermediate positions is recorded when a trip updating event is detected, and
wherein the stopping position is recorded when termination of the first connection is detected; and
generating a mileage report using the sequence of positions of the first trip.

7. A system for automatically tracking mileage, comprising:
a mobile device of the user comprising a wireless sensor, a computer processor, and a memory comprising instructions that, when executed by the computer processor, cause the computer processor to:
detect a first connection between the wireless sensor and a first wireless device of a first vehicle of a user;
determine that the first wireless device corresponds to the first vehicle;
initiate tracking of a first trip of the first vehicle in response to detecting the first connection;
detect termination of the first connection using the wireless sensor;
stop tracking of the first trip in response to detecting the termination of the first connection;
determine that the termination of the first connection was caused by a dropped connection; and
resume tracking of the first trip in response to determining that the termination of the first connection was caused by the dropped connection; and
a data repository storing at least the first trip.

8. The system of claim 7, wherein determining that the first wireless device corresponds to the first vehicle comprises:
identifying a device name of the wireless device, wherein the device name comprises a name of a vehicle manufacturer.

9. The system of claim 7, wherein the mobile device further comprises a first geolocation sensor, wherein the first vehicle further comprises a second geolocation sensor, wherein the memory further comprises instructions that, when executed by the processor, cause the processor to:
record, using the first geolocation sensor, a user position when termination of the first connection is detected;
record, using the second geolocation sensor, a vehicle position when termination of the first connection is detected; and
determine that a distance between the user position and the vehicle position is within a pre-determined distance.

10. The system of claim 7, wherein the mobile device further comprises a first geolocation sensor, wherein determining that the termination of the first connection was caused by a dropped connection comprises:
recording, using the first geolocation sensor, an intermediate position and an intermediate timestamp when a trip updating event is detected;
recording, using the first geolocation sensor, a stopping position and a stopping timestamp when termination of the first connection is detected;
calculating a velocity using the intermediate position, the stopping position, the intermediate timestamp, and the stopping timestamp; and
determining that the velocity exceeds a threshold velocity.

11. The system of claim 10, wherein the first vehicle further comprises a second geolocation sensor, wherein the memory further comprises instructions that, when executed by the processor, cause the processor to:
record, using the second geolocation sensor, a vehicle position when termination of the first connection is detected; and
determine that a distance between the stopping position and the vehicle position is within a pre-determined distance.

12. The system of claim 7, wherein the mobile device further comprises a geolocation sensor, wherein the memory further comprises instructions that, when executed by the processor, cause the processor to:
record, using the geolocation sensor of the mobile device, a sequence of positions of the first trip comprising a starting position, a set of intermediate positions, and a stopping position,
wherein the starting position is recorded when the first connection is detected, wherein each intermediate position of the set of intermediate positions is recorded when a trip updating event is detected, and wherein the stopping position is recorded when termination of the first connection is detected; and generate a mileage report using the sequence of positions of the first trip.

13. A non-transitory computer readable medium comprising instructions that, when executed by a processor, perform a method for automatically tracking mileage, comprising:

detecting a first connection between a wireless sensor of a mobile device of a user and a first wireless device;

determining that the first wireless device corresponds to a first vehicle of the user;

initiating tracking of a first trip of the first vehicle in response to detecting the first connection;

detecting termination of the first connection using the wireless sensor;

stopping tracking of the first trip in response to detecting the termination of the first connection;

determining that the termination of the first connection was caused by a dropped connection; and resuming tracking of the first trip in response to determining that the termination of the first connection was caused by the dropped connection.

14. The non-transitory computer readable medium of claim 13, wherein determining that the first wireless device corresponds to the first vehicle comprises:

identifying a device name of the wireless device, wherein the device name comprises a name of a vehicle manufacturer.

15. The non-transitory computer readable medium of claim 13, wherein determining that the termination of the first connection was caused by a dropped connection comprises:

recording, using a geolocation sensor of the mobile device, a user position when termination of the first connection is detected;

recording, using a geolocation sensor of the first vehicle, a vehicle position when termination of the first connection is detected; and determining that a distance between the user position and the vehicle position is within a pre-determined distance.

16. The non-transitory computer readable medium of claim 13, wherein determining that the termination of the first connection was caused by a dropped connection comprises:

recording, using a geolocation sensor of the mobile device, an intermediate position and an intermediate timestamp when a trip updating event is detected;

recording, using the geolocation sensor of the mobile device, a stopping position and a stopping timestamp when termination of the first connection is detected;

calculating a velocity using the intermediate position, the stopping position, the intermediate timestamp, and the stopping timestamp; and determining that the velocity exceeds a threshold velocity.

17. The non-transitory computer readable medium of claim 16, wherein determining that the termination of the first connection was caused by a dropped connection comprises:

recording, using a geolocation sensor of the first vehicle, a vehicle position when termination of the first connection is detected; and determining that a distance between the stopping position and the vehicle position is within a pre-determined distance.

18. The method of claim 1, wherein determining that the first wireless device corresponds to the first vehicle comprises:

identifying a device code of the first wireless device, wherein the device code identifies the first wireless device as being installed in a vehicle.

19. The system of claim 7, wherein determining that the first wireless device corresponds to the first vehicle comprises:

identifying a device code of the first wireless device, wherein the device code identifies the first wireless device as being installed in a vehicle.

20. The non-transitory computer readable medium of claim 13, wherein determining that the first wireless device corresponds to the first vehicle comprises:

identifying a device code of the first wireless device, wherein the device code identifies the first wireless device as being installed in a vehicle.

* * * * *